Feb. 16, 1960     W. E. RODLER, JR     2,924,997

FORWARD-REVERSE DRIVE MECHANISM

Filed Aug. 21, 1958

*INVENTOR.*
W. E. RODLER JR.

BY

ATTORNEY

# United States Patent Office 2,924,997
Patented Feb. 16, 1960

2,924,997

FORWARD-REVERSE DRIVE MECHANISM

Waldo E. Rodler, Jr., Muscatine, Iowa, assignor to Shawver Company, Davenport, Iowa, a corporation of Iowa Application August 21, 1958, Serial No. 756,458

7 Claims. (Cl. 74—752)

This invention relates to the art of mechanical power transmission and more particularly to forward-reverse drive mechanism having a neutral or non-driving status when an input shaft rotates at a certain speed and operative automatically to incur forward drive in response to acceleration of said shaft, together with planetary or epicyclic gearing including a planet carrier adapted to be braked or held to provide reverse drive at speeds of the input shaft below the aforesaid certain speed. Features of the invention reside in a novel, compact self-contained unit that may be coaxially mounted directly on a power shaft independent of additional support; a simple and efficient drive enabling automatic forward drive simply by acceleration, and a quiet-running drive embodying no gear shifting, simplified but rugged parts, and a governed reverse speed obtained because excess acceleration in reverse causes automatic engagement of the speed-responsive clutch which counteracts the results of the applied brake and thus the clutch itself acts as a brake in reverse drive.

Other features and advantages will appear as preferred embodiments of the invention are disclosed by way of examples in the ensuing description and drawing, the figures of which are described below.

Figure 1:
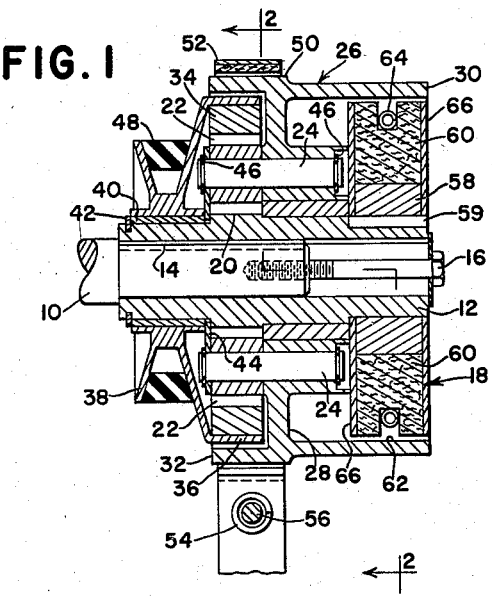
Figure 1 is a longitudinal section of one form of drive mechanism.

The numeral 10 in Figure 1 represents a drive shaft or power output member driven by any suitable variable-speed source, such as an internal combustion engine, not shown because not specifically material. Normally such shaft projects from the source and is adequately supported and journaled therein so as to be capable of carrying a drive unit of substantial weight, such as a sheave etc. In the present case, the forward-reverse drive mechanism is a compact unit supported wholly by this shaft by means of a hollow driving shaft 12, keyed at 14 to the shaft 10 and additionally retained by a long coaxial cap screw 16 which also serves to retain a speed-responsive clutch or frictional means 18, the details of which will be described later.

The shaft 12 has integrally or otherwise associated therewith a sun gear 20 which is in constant mesh with a pair of diametrically opposed planet pinions 22 journaled on short shafts 24 mounted in a carrier 26. This carrier is in the form of a double drum element having a radial web 28 and opposite annular cups 30 and 32, the latter of which encircles and forms a chamber for the clutch 18 and the former of which loosely encircles the general area of the pinions 22. Part of this area is occupied by a ring gear 34 which is rigidly retained, as by a press fit, within an annular flange 36 of a driven member 38, the hub of which is journaled on the shaft 12 by a bearing 40 and retained as by a snap ring 42. A bearing or washer 44 is interposed between the member 38 and the carrier pinions, and snap rings 46 are shown as typical means for retaining the pinion shafts 24.

The driven member 38 is here in the form of a sheave and is shown as carrying a belt 48 for connection to a load, such, for example, as vehicle wheels (not shown).

The carrier drum 26 presents an outer annular surface 50 which cooperates with a band brake 52, normally released as by a spring 54 (Figure 2) and contractible by any suitable means, such as at 56, to hold the carrier against rotation, it being understood that the band 52 or the means 56 is anchored to a suitable support so as to remain stationary relative to the carrier. Hence, when the shaft 12 is driven, the sun gear 20 drives the pinions 22 and the pinions in turn drive the ring gear 34 in the direction opposite to that of the shaft 12. Since the ring gear is part of the driven member 38, the driven member, and whatever load is connected thereto, is operated in reverse.

The clutch 18 is of the centrifugal or speed-responsive type and the details thereof are not per se material. The type shown comprises a central driver 58 keyed to or otherwise fixed to the shaft 12, as at 59, and a plurality of radially movable segmental friction blocks 60. These blocks slidably engage the driver for radial expansion into frictional engagement with the interior annular surface afforded at 62 on the carrier drum, and the blocks are biased against radial expansion as by a garter spring 64. Opposite radial plates 66 retain the blocks against axial displacement. When the brake 52 is released and the shaft 12 is driven at a speed below a predetermined value, the clutch 18 will be disengaged, because the garter spring 54 will hold the blocks 60 in, and no power will be transmitted to the member 38. However, if the shaft 12 is accelerated, the blocks 60 move out and engage the carrier drum at 62, driving the drum in the same direction as the shaft 12. Since the gearing 20—22—34 is in constant mesh, the entire epicyclic unit rotates as one and the member 38 is directly coupled to the shaft 12. The frictional engagement of the clutch increases with acceleration of the shaft, as when the engine throttle (not shown) is opened.

To obtain reverse drive, the shaft is decelerated until the clutch 18 automatically disengages and then the brake 52 is applied. If, while the brake is applied to obtain reverse, the shaft 12 is accelerated above the predetermined speed at which the clutch 18 engages, the clutch will of course automatically engage, tending to drive the driven member 38 forwardly and thus to oppose the activated reverse drive. In other words, the clutch now acts as a brake and hence governs the speed at which the mechanism can operate in reverse. This is a highly desirable feature, particularly in vehicles where safety dictates a low-speed reverse, while still tolerating a relatively higher speed drive in forward.

It will be observed that the compartmentation of the carrier 26, as by the wall 28 and chambers 30 and 32, keeps the frictional components (clutch 18) and lubricated components (gears 20 and 34 and pinions 22) separate. Likewise, the brake 52, being outside the carrier is separate from the lubricated components. As already noted, the unit is self-contained, being wholly mounted on the shaft 12 and this shaft is mounted on the power shaft 10, needing no extraneous support.

Figure 3:
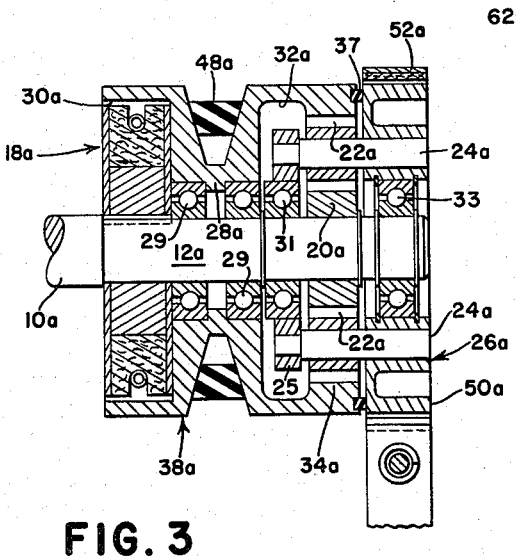
Figure 3 is a longitudinal section of a modified form of drive mechanism.

In the modified form of drive mechanism shown in Figure 3, the same or similar components are employed. Hence, there will be recognized a power shaft 10a which here has an integral driving shaft extension 12a to which a sun gear 20a is fixed, preferably by a press fit; although a key could be used if desired. In this case, the driven member 38a is in the form of a drum having a radial central web portion 28a which internally carries a pair of bearings 29 for journalling on the shaft 12a and which is externally formed as a sheave to carry a belt 48a. One internal half of the drum, at 30a, embraces a clutch 18a, in all material respects identical to the clutch 18, and the other half, at 32a, embraces the epicyclic gearing, including the sun gear 20a, planet pinions 22a and a ring gear 34a. In this case, the ring gear is an integral internal part of the drum member 38a. A bearing 31 on the shaft 12a journals a ring 25 which is part of a planet pinion carrier 26a, the axially outer part of which is a brake drum 50a. The ring 25 and drum 50a are rigidly connected by shafts 24a which also journal the pinions 22a. An outboard bearing 33 on the shaft 12a completes the journaling of the composite carrier 26a. Snap rings as shown axially locate and confine the bearings and the associate parts.

Figure 2:
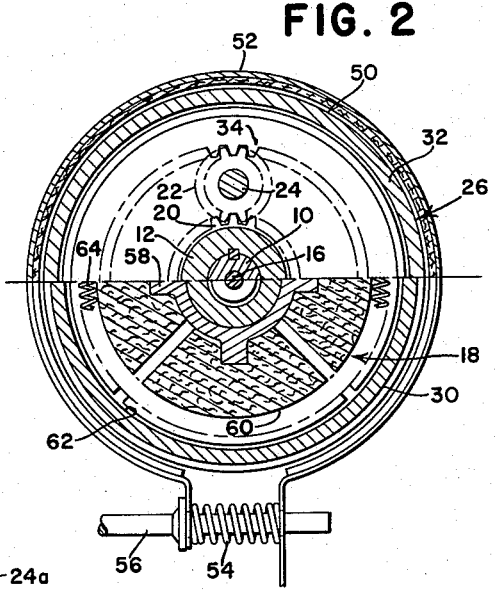
Figure 2 is a cross section on the line 2—2 of Figure 1.

A band brake 52a, in all material respects identical to the brake 52 in Figures 1 and 2 encircles the carrier brake drum 50a. An annular seal 37 runs between the two drums 38a and 50a.

When the clutch 18a and brake 52a are released and the shaft 10a—12a is driven, the load on the sheave drum 38a via the belt 48a will temporarily fix the ring gear 34a (since it is part of the sheave drum) and the sun gear 20a will drive the carrier 26a via the planets 22a. When the shaft 10a—12a is accelerated, with the brake 52a still released, the clutch 18a will engage with the inner surface of the sheave drum portion 30a and will thus couple the sheave drum and shaft together for rotation in unison (in the same direction and at the same speed). When the shaft is decelerated, the neutral condition of the mechanism will again occur. When the brake 52a is engaged, without accelerating the shaft 10a—12a, the carrier 26a becomes locked and the sun gear 20a drives the ring gear 34a, and consequently the sheave drum 38a, in the reverse direction via the planet pinions 22a. Again, as in Figures 1 and 2, if the shaft 10a—12a is accelerated while the brake 52a is engaged, the braking action of the clutch 18, as it engages, is brought into play, and again the rate of reverse rotation is governed; i.e., it cannot exceed a predetermined speed.

Both forms of the invention feature the shaft-to-sheave clutch drive for forward at any desired speed; the planetary reverse drive at a speed governed below a predetermined value; simplified and compact design; quiet, fool-proof operation; and a self-contained unit in which the internal parts are mutually self-supporting and in general substantially enclosed so as to be dirt-free to require little maintenance. Although, the invention has been described in terms of a clutch drive forward and a gear drive in reverse, the arrangement can be reversed according to requirements.

Features other than those specifically pointed out will readily occur to those versed in the art, as will many variations in the preferred inventive embodiments disclosed, and all of these are available without departure from the spirit and scope of the invention.

What is claimed is:

1. Forward-reverse drive mechanism, comprising: a driving shaft having a sun gear fixed coaxially thereto; a planet carrier coaxially journaled on the shaft and having a planet pinion in mesh with the sun gear; a driven member coaxially journaled on the shaft and having rigid therewith a ring gear element meshing with the planet pinion; normally released brake means engageable with and for holding the carrier so that rotation of the driving shaft in one direction and at a speed below a predetermined value acts through the sun gear, planet pinion, held carrier and ring gear element to turn the driven member in the opposite direction and at a speed below that of the driving shaft; and a centrifugal clutch fixed to the driving shaft and operative responsive to rotation of the driving shaft in said one direction at a speed above said predetermined value to engage the driven member so as to cause the driven member to rotate in the same direction and at the same speed as said shaft.

2. Forward-reverse drive mechanism, comprising: a driving shaft having a sun gear fixed coaxially thereto; a planet carrier coaxially journaled on the shaft and having a planet pinion in mesh with the sun gear; drum means coaxially rigid with the carrier and providing an interior annular surface and an exterior annular surface; a driven member coaxially journaled on the shaft and having rigid therewith a ring gear element meshing with the planet pinion; normally released brake means engageable with the exterior surface of the drum for holding the carrier so that rotation of the driving shaft in one direction and at a speed below a predetermined value acts through the sun gear, planet pinion, held carrier and ring gear element to turn the driven member in the opposite direction and at a speed below that of the driving shaft; and a centrifugal clutch fixed to the driving shaft within the drum and including radially expansive means engageable with the interior surface of the drum upon rotation of the driving shaft in said one direction at a speed above said predetermined value whereby to drive the carrier, ring gear and driven member in the same direction and at the same speed as said shaft.

3. Forward-reverse drive mechanism, comprising: a driving shaft having a sun gear fixed coaxially thereto; a planet carrier coaxial with the shaft at one side of the sun gear; means journaling the carrier on the shaft; a planet pinion journaled on the carrier and in mesh with the sun gear; a driven member coaxial with the shaft at the other side of the sun gear and having a ring gear portion in mesh with the planet pinion; means journaling the driven member on the shaft; normally disengaged clutch means enabling rotation of the shaft relative to the driven member at a predetermined speed of said shaft and operative automatically in response to acceleration of the shaft to engage between said shaft and driven member for causing the driven member to be coupled to the shaft for rotation with and in the same direction as the shaft; and normally released brake means engageable to hold the carrier when rotation of the shaft occurs below said predetermined speed for incurring reverse rotation of the driven member relative to the shaft.

4. Forward-reverse driving mechanism, comprising: a driving shaft; a driven member coaxial with said shaft; means journaling said member on said shaft; normally inactive reverse drive means between said shaft and member enabling rotation of said shaft relative to said member and operative to drive the member from the shaft but in a reverse direction; means for activating the reverse drive means for causing the shaft to drive said member reversely; and frictional means responsive automatically to acceleration of the shaft above a predetermined speed for coupling the shaft to the member to tend to drive the member forwardly and hence to oppose the reverse drive means so as to prevent overspeeding of said member in reverse.

5. Forward-reverse driving mechanism, comprising: a driving shaft; a driven member coaxial with and journaled relative to said shaft; normally inactive reverse drive means between said shaft and member enabling rotation of said shaft relative to said member and operative to drive the member from the shaft but in a reverse direction; means for activating the reverse drive means for causing the shaft to drive said member reversely; and frictional means responsive automatically to acceleration of the shaft above a predetermined speed for coupling the shaft to the member to tend to drive the member forwardly and hence to oppose the reverse drive means so as to prevent overspeeding of said member in reverse.

6. A forward-reverse drive mechanism, comprising: a driving shaft; a sun gear on the shaft intermediate its ends and rotatable therewith; a driven member journaled on the shaft at one side of the sun gear and having an annular portion extending over and loosely encircling said sun gear, said portion having an internal ring gear thereon in the general radial plane of the sun gear; a carrier member journaled on the shaft at the other side of the sun gear and including a pinion shaft axially overhanging the sun gear; a planet pinion journaled on said pinion shaft and meshing with the sun gear and ring gear; annular drum means journaled on the driving shaft for rotation with one of said members; a normally disengaged clutch automatically engageable between the driving shaft and drum means in response to rotation of said driving shaft above a predetermined speed whereby to couple said driving shaft to the member that is rotatable with the drum means; and normally disengaged brake means engageable with the carrier means at speeds of the driving shaft below said predetermined speed for holding the carrier member so that the driving shaft acts through the sun gear and planet pinion to drive the ring gear and consequently the driven member in the direction opposite to the driving shaft.

7. A forward-reverse drive mechanism, comprising: a driving shaft; a sun gear on the shaft and rotatable therewith; a driven member journaled on the shaft and having an internal ring gear thereon in the general radial plane of the sun gear; a carrier member journaled on the shaft and including a pinion shaft; a planet pinion journaled on said pinion shaft and meshing with the sun gear and ring gear; annular drum means journaled on the driving shaft for rotation with one of said members; a normally disengaged clutch automatically engageable between the driving shaft and drum means in response to rotation of said driving shaft above a predetermined speed whereby to couple said driving shaft to the member that is rotatable with the drum means; and normally disengaged brake means engageable with the carrier means at speeds of the driving shaft below said predetermined speed for holding the carrier member so that the driving shaft acts through the sun gear and planet pinion to drive the ring gear and consequently the driven member in the direction opposite to the driving shaft.

References Cited in the file of this patent

UNITED STATES PATENTS

| | | |
|---|---|---|
| 1,189,049 | Britton | June 27, 1916 |
| 2,305,822 | Wittner | Dec. 22, 1942 |
| 2,649,817 | La Voque | Aug. 25, 1953 |
| 2,848,907 | Wilson | Aug. 26, 1958 |